(No Model.)
D. SWANSON.
CORN POPPER.
No. 471,152. Patented Mar. 22, 1892.
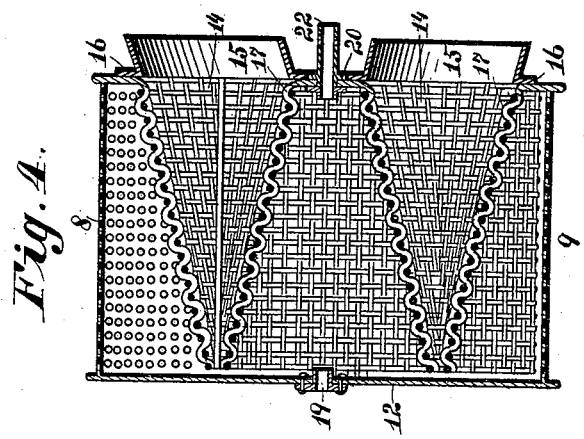
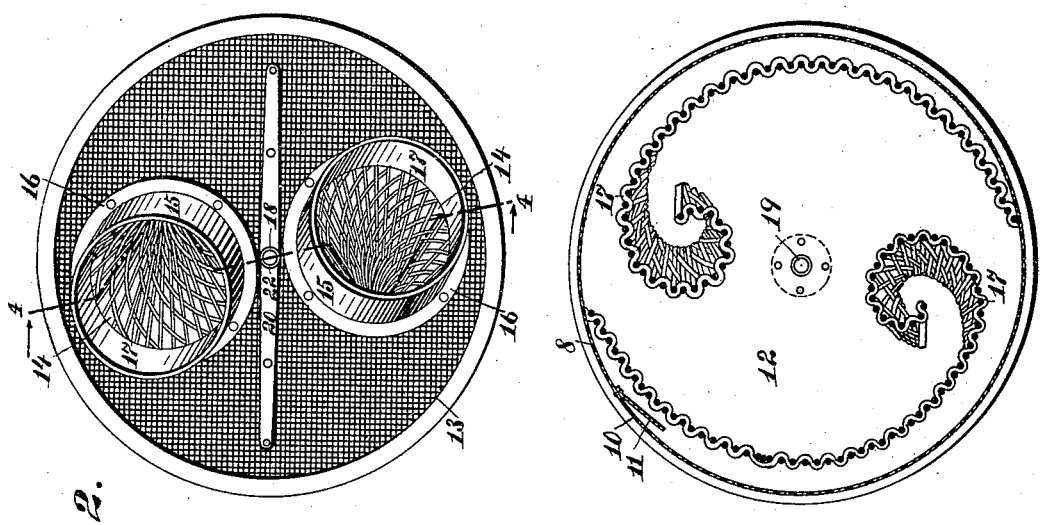
Witnesses:
F. G. Fischer
Jno. L. Coudron
Inventor:
Daniel Swanson,
By Higgen & Higgen
Attys.

UNITED STATES PATENT OFFICE.

DANIEL SWANSON, OF KANSAS CITY, MISSOURI.

CORN-POPPER.

SPECIFICATION forming part of Letters Patent No. 471,152, dated March 22, 1892.

Application filed August 15, 1891. Serial No. 402,741. (No model.)

*To all whom it may concern:*

Be it known that I, DANIEL SWANSON, of Kansas City, Jackson county, Missouri, have invented certain new and useful Improvements in Corn-Poppers, of which the following is a full, clear, and exact description, reference being had to the accompanying drawings, forming a part hereof.

My invention relates to machines for popping corn, roasting peanuts or chestnuts, and for similar purposes; and the objects of my invention are to produce a machine which shall be simple, durable, and inexpensive in construction, easy to operate, and very effective in its action.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a side elevation of a corn-popping machine constructed in accordance with my invention. Fig. 2 is an end elevation of the revoluble popping-cylinder. Fig. 3 is a transverse vertical section of said cylinder on the line 3 3 of Fig. 1. Fig. 4 is a transverse vertical section of the cylinder on the line 4 4 of Fig. 2.

In the said drawings, 1 designates a standard or support, which is preferably constructed of gas-pipe, and the lower end of which is connected to the upper end of a tripod-like base 2. To the upper end of the support 1 is attached a suitable reservoir 3 for gasoline or similar liquid-fuel, the said reservoir having its front side provided with two or any suitable or preferred number of loops 4, which embrace the upper end of the support and which thus removably connect the reservoir to the support. From the lower part of this reservoir 3 leads an L-shaped feed-pipe 5, to the lower end of which is connected a suitable burner 6, a suitable valve 7 being placed in the lower part of the burner or of the feed-pipe to regulate the supply of fuel to said burner.

8 designates the casing of the popping-cylinder, said casing being preferably of sheet metal and of circular form and provided with numerous holes or perforations 9. At one side this casing is provided with an elongated transverse opening 10, a deflector 11 being secured to the inner surface of the casing adjacent to said opening 10 and extending obliquely inward across said opening.

12 designates the back of the cylinder, which, like the casing 8, is of sheet metal; but said backing is preferably not perforated.

The front 13 of the casing is preferably of wire-cloth, and is formed at opposite sides of its center with two openings 14 of considerable diameter. To the circular margin of each of these openings is secured by rivets 16 or other suitable devices a short circular spout 15, which extends obliquely outward from the front 13 of the casing, the inclination of the two spouts being opposite, as shown in Figs. 2 and 3. From these openings 14 extend inwardly two helical partitions 17, also of wire-cloth, and the convolutions of which wind oppositely from each other within the cylinder, the outer ends of these partitions being connected to the inner surface of the casing 8 at opposite points, as shown in Fig. 4. Through the center of this cylinder extends a shaft 18, the rear portion of which extends through a bearing 19, secured to the back 12, and the front portion of which extends through a tubular bearing 22 in the middle of a bar 20, which is riveted upon the front of the cylinder. The upper end of the crank-handle 21 is inserted into the outer end of this tubular bearing, while the rear end of the shaft 18 is screwed into a socket 23 upon the standard or support 1.

It will thus be seen that when the machine is in operation the crank-handle is to be constantly turned in one direction, carrying the cylinder with it, and the corn or nuts to be thrown occasionally into the spouts 15. As the cylinder is revolved the corn works along the partitions 17 and out of the casing 8, where it is popped or roasted, the dust and husks being sifted through the partitions and discharged through the opening 10. When the corn or nuts are completely popped or roasted, a few reversed turns are given to the cylinder, causing the corn or nuts to travel back along the partitions 17 and to be discharged through the spouts 15. The machine is simple and durable in construction, inexpensive, and easily operated.

Having thus described my invention, what I claim as new therein, and desire to secure by Letters Patent, is—

1. An improved corn-popping machine comprising a suitable standard, a supporting shaft or arm extending laterally from the standard, a revoluble cylinder mounted on said shaft or arm and provided at its outer or front side with a tubular bearing-sleeve and a pair of openings, a crank-handle attached to said sleeve, a pair of inclined spouts attached to the openings, and a pair of helical partitions communicating with the openings and extending spirally within the cylinder, substantially as set forth.

2. An improved corn-popper comprising a popping-cylinder consisting of a circular foraminous peripheral casing having a transverse opening, a deflector secured to the inner surface of the opening and extending obliquely within the cylinder and across said opening, a pair of disk-shaped end portions or heads connected at their margins to the sides of the peripheral casing, a pair of inlet and discharge openings formed at opposite points from the center of the outer or front head, a pair of oppositely-extending oblique circular spouts, each secured to the outer surface of the front head and projecting outwardly therefrom, and a pair of spiral partitions, each separate from the circular peripheral casing and communicating at their outer portions with the said discharge-openings, the said partitions being curved oppositely from each other and having their outer edges secured at opposite points to the inner surface of the circular peripheral casing, substantially as set forth.

In testimony whereof I affix my signature in presence of two witnesses.

DANIEL SWANSON.

Witnesses:
JNO. L. CONDRON,
H. E. PRICE.